(12) United States Patent
Bansal et al.

(10) Patent No.: US 12,556,953 B2
(45) Date of Patent: Feb. 17, 2026

(54) PERIODIC STREAMING OF REPORTS FROM USER EQUIPMENTS

(71) Applicant: QUALCOMM Incorporated, San Diego, CA (US)

(72) Inventors: Hargovind Prasad Bansal, Hyderabad (IN); Tom Chin, San Diego, CA (US); Shankar Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 18/000,448

(22) PCT Filed: Jun. 4, 2021

(86) PCT No.: PCT/US2021/035871
§ 371 (c)(1),
(2) Date: Dec. 1, 2022

(87) PCT Pub. No.: WO2022/020016
PCT Pub. Date: Jan. 27, 2022

(65) Prior Publication Data
US 2023/0224746 A1 Jul. 13, 2023

(30) Foreign Application Priority Data
Jul. 24, 2020 (IN) .............................. 202041031675

(51) Int. Cl.
*H04W 24/10* (2009.01)
*H04W 24/02* (2009.01)
(Continued)

(52) U.S. Cl.
CPC ........... *H04W 24/10* (2013.01); *H04W 24/02* (2013.01); *H04W 72/1268* (2013.01); *H04W 76/20* (2018.02)

(58) Field of Classification Search
CPC . H04W 24/10; H04W 24/02; H04W 72/1268; H04W 76/20; H04W 52/0216;
(Continued)

(56) References Cited

U.S. PATENT DOCUMENTS

2005/0255893 A1* 11/2005 Jin ..................... H04W 52/0229
455/127.1
2013/0114446 A1* 5/2013 Liu ....................... H04W 24/10
370/252
(Continued)

FOREIGN PATENT DOCUMENTS

CN 109474953 A 3/2019
CN 111405589 A * 7/2020 ............ H04W 24/02
(Continued)

OTHER PUBLICATIONS

English Translation to Xia et al (CN Publication No. 111885683) (Year: 2019).*
(Continued)

*Primary Examiner* — Sun Jong Kim
(74) *Attorney, Agent, or Firm* — Harrity & Harrity, LLP

(57) ABSTRACT

A user equipment (UE) may receive, from a base station, configuration information that indicates one or more first measurement types. Accordingly, the UE may transmit, to the base station, periodically and while the UE is in an idle mode or an inactive state, first measurements based at least in part on the one or more first measurement types indicated in the configuration information. The UE may further transmit, to the base station, second measurements based at least in part on a second measurement type. The first measurement type(s) may be associated with a minimization of drive test (MDT). Similarly, the second measurement type may be associated with an MDT.

28 Claims, 8 Drawing Sheets

(51) Int. Cl.
   *H04W 72/1268* (2023.01)
   *H04W 76/20* (2018.01)
(58) Field of Classification Search
   CPC . H04W 52/0245; H04W 92/045; H04W 8/24; H04W 24/08; H04W 52/0212; Y02D 30/70; G06F 1/3209
   See application file for complete search history.

(56) References Cited

U.S. PATENT DOCUMENTS

| | | | |
|---|---|---|---|
| 2014/0043990 | A1 | 2/2014 | Lin |
| 2017/0311193 | A1* | 10/2017 | Jiang ............... H04W 24/10 |
| 2022/0045924 | A1* | 2/2022 | Yao ................ H04W 12/037 |
| 2022/0151011 | A1* | 5/2022 | Chang .............. H04W 76/18 |
| 2022/0312532 | A1* | 9/2022 | Rugeland ........... H04W 76/20 |

FOREIGN PATENT DOCUMENTS

| | | | |
|---|---|---|---|
| WO | 2019194518 | A1 | 10/2019 |
| WO | 2019197711 | A1 | 10/2019 |

OTHER PUBLICATIONS

"User Equipment (UE) radio access capabilities (Release 16)", 3GPP TS 38.306 version 16.1.0 Release 16, Jul. 23, 2020 (Year: 2020).*

Retrieved date for 3GPP1 (Year: 2020).*

"3rd Generation Partnership Project, Technical Specification Group Radio Access Network, NG-RAN, Xn Application Protocol (XnAP) (Release 16)", 3GPP Standard, Technical Specification, 3GPP TS 38.423, 3rd Generation Partnership Project (3GPP), Mobile Competence Centre, 650, Route Des Lucioles, F-06921 Sophia-Antipolis Cedex, France, vol. RAN WG3, No. V16.2.0, Jul. 17, 2020 (Jul. 17, 2020), pp. 1-447, XP051925473, paragraph 9.3.1.169 paragraph 9.3.1.171.

"3rd Generation Partnership Project, Technical Specification Group Radio Access Network, NR, User Equipment (UE) Radio Access Capabilities (Release 16)", 3GPP Draft, 3GPP TS 38.306 V16.10.0 (2020-073), Draft 38306-G10 V4, 3rd Generation Partnership Project (3GPP), Mobile Competence Centre, 650, Route Des Lucioles, F-06921 Sophia-Antipolis Cedex, France, Jul. 23, 2020 (Jul. 23, 2020), XP051909975, 99 Pages, paragraph 4.2.18.

"3rd Generation Partnership Project, Technical Specification Group Radio Access Network, Universal Terrestrial Radio Access (UTRA), Evolved Universal Terrestrial Radio Access (E-UTRA) and Next Generation Radio Access, Radio Measurement Collection for Minimization of Drive Tests (MDT), Overall Description", 37320-G10, TS 37.320, V16.1.0, 3rd Generation Partnership Project, Mobile Competence Centre, 650, Route Des Lucioles, F-06921 Sophia-Antipolis Cedex, France, Jul. 19, 2020, XP0151909518, 34 Pages, paragraph 5.1.1 and 5.1.2.

International Search Report and Written Opinion—PCT/US2021/035871—ISA/EPO—Sep. 22, 2021.

* cited by examiner

PERIODIC STREAMING OF REPORTS FROM USER EQUIPMENTS

CROSS-REFERENCE TO RELATED APPLICATIONS

This Patent Application is a 371 national stage of PCT Application No. PCT/US2021/035871 filed on Jun. 4, 2021, entitled "PERIODIC STREAMING OF REPORTS FROM USER EQUIPMENTS," which claims priority to Indian Provisional patent application No. 2020041031675, filed on Jul. 24, 2020, entitled "PERIODIC STREAMING OF REPORTS FROM USER EQUIPMENTS." The disclosure of the prior Applications are considered part of and are hereby expressly incorporated by reference in this Patent Application.

FIELD OF THE DISCLOSURE

Aspects of the present disclosure generally relate to wireless communication and to techniques and apparatuses for periodic streaming of reports from user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, configuration information that indicates one or more first measurement types; and transmitting, to the base station, periodically and while in an idle mode or an inactive state, first measurements based at least in part on the one or more first measurement types indicated in the configuration information.

In some aspects, a method of wireless communication performed by a base station includes transmitting, to a UE, configuration information that indicates one or more first measurement types; and receiving, from the UE, periodically and while the UE is in an idle mode or an inactive state, first measurements based at least in part on the one or more first measurement types indicated in the configuration information.

In some aspects, a UE for wireless communication includes a memory and one or more processors coupled to the memory, the memory and the one or more processors configured to receive, from a base station, configuration information that indicates one or more first measurement types; and transmit, to the base station, periodically and while in an idle mode or an inactive state, first measurements based at least in part on the one or more first measurement types indicated in the configuration information.

In some aspects, a base station for wireless communication includes a memory and one or more processors coupled to the memory, the memory and the one or more processors configured to transmit, to a UE, configuration information that indicates one or more first measurement types; and receive, from the UE, periodically and while the UE is in an idle mode or an inactive state, first measurements based at least in part on the one or more first measurement types indicated in the configuration information.

In some aspects, a non-transitory computer-readable medium storing a set of instructions for wireless communication includes one or more instructions that, when executed by one or more processors of a UE, cause the UE to: receive, from a base station, configuration information that indicates one or more first measurement types; and transmit, to the base station, periodically and while in an idle mode or an inactive state, first measurements based at least in part on the one or more first measurement types indicated in the configuration information.

In some aspects, a non-transitory computer-readable medium storing a set of instructions for wireless communication includes one or more instructions that, when executed by one or more processors of a base station, cause the base station to: transmit, to a UE, configuration information that indicates one or more first measurement types; and receive, from the UE, periodically and while the UE is in an idle mode or an inactive state, first measurements based at least in part on the one or more first measurement types indicated in the configuration information.

In some aspects, an apparatus for wireless communication includes means for receiving, from a base station, configuration information that indicates one or more first measurement types; and means for transmitting, to the base station, periodically and while in an idle mode or an inactive state, first measurements based at least in part on the one or more first measurement types indicated in the configuration information.

In some aspects, an apparatus for wireless communication includes means for transmitting, to a UE, configuration information that indicates one or more first measurement types; and means for receiving, from the UE, periodically and while the UE is in an idle mode or an inactive state, first measurements based at least in part on the one or more first measurement types indicated in the configuration information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffer, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
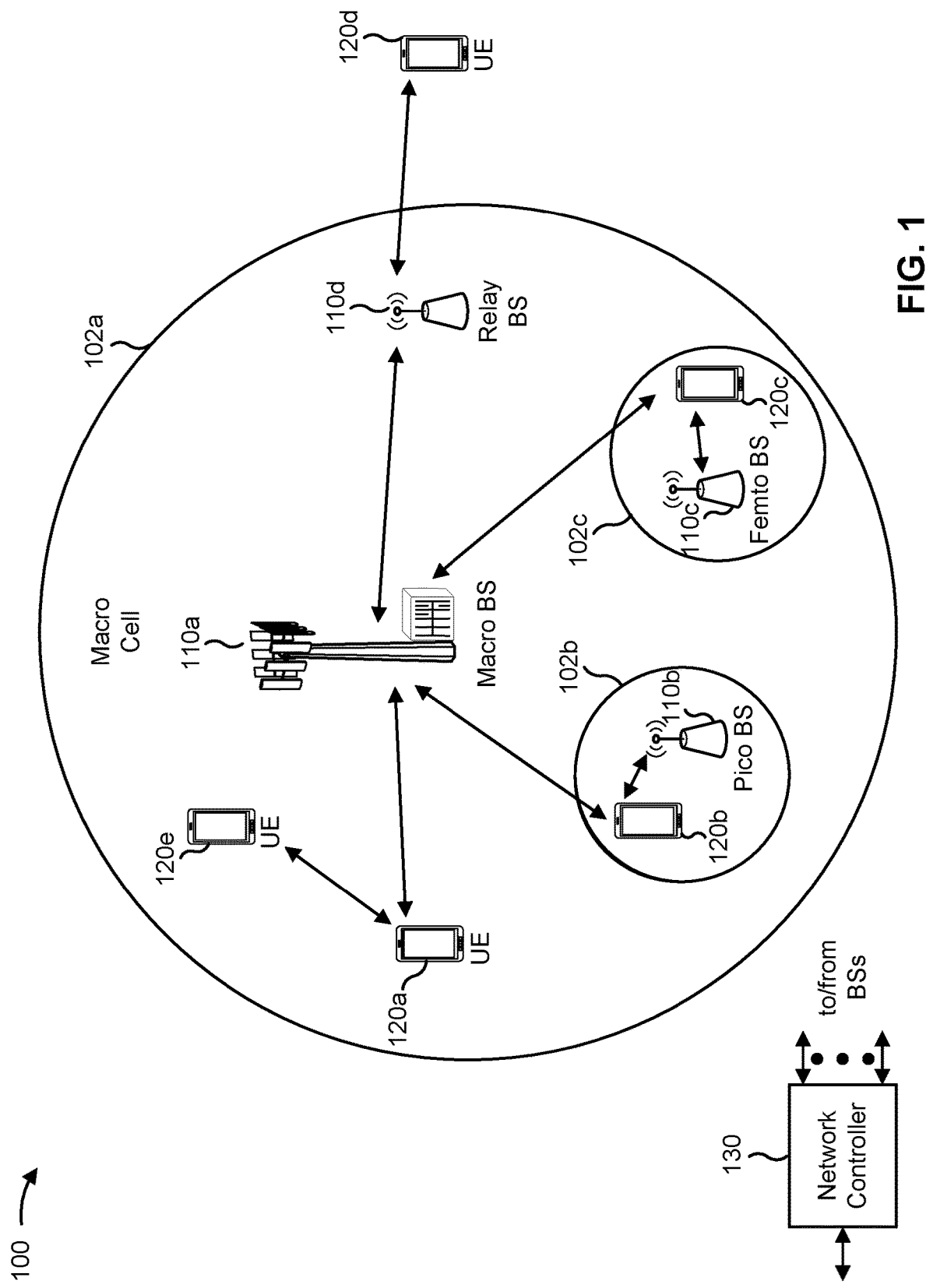
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
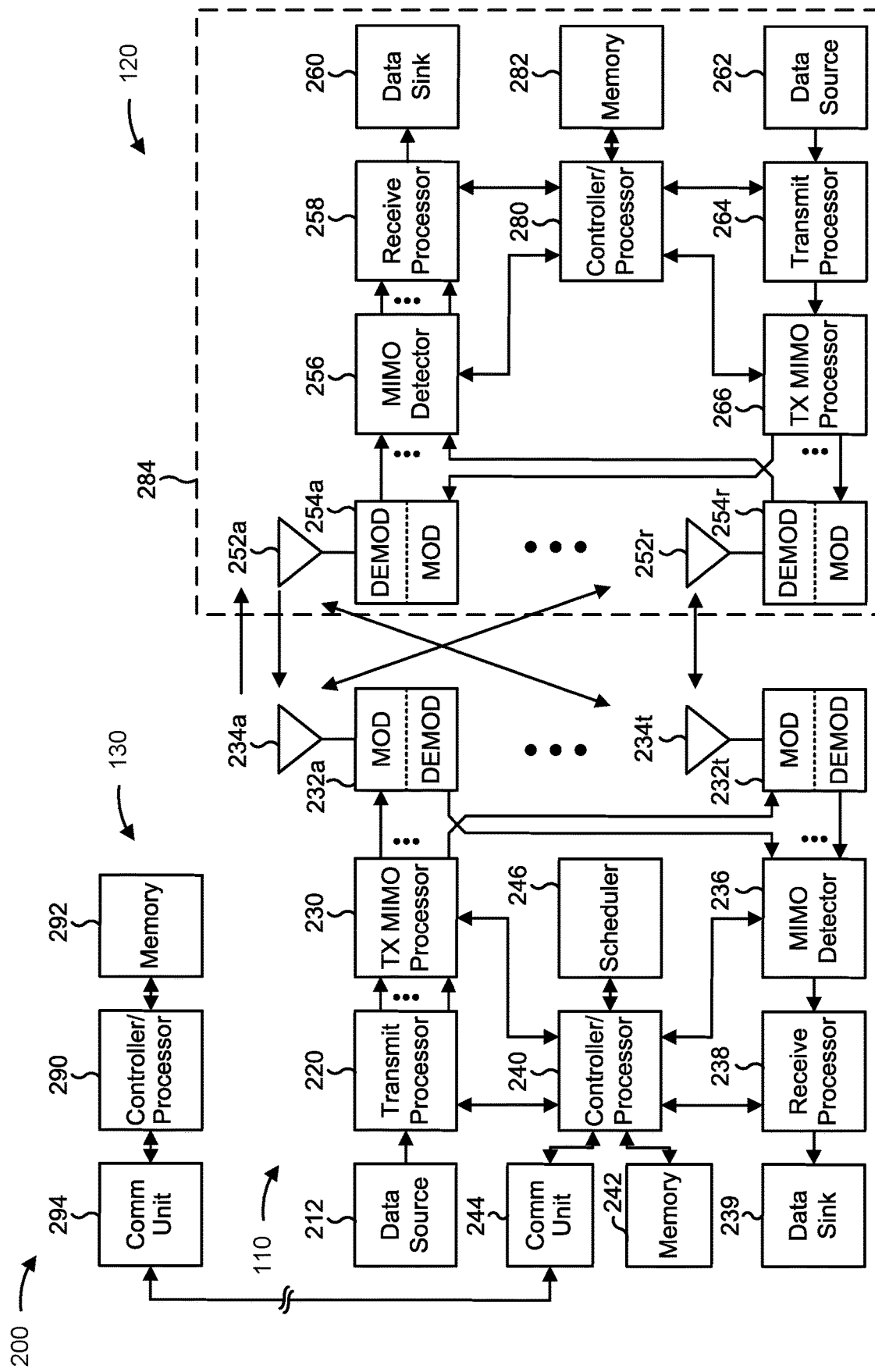
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 5-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 5-8).

Controller/processor 240 of base station 110, controller/processor 280 of UE 120, and/or any other component(s) of FIG. 2 may perform one or more techniques associated with periodic streaming of reports from UEs, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a UE (e.g., the UE 120) may include means for receiving, from a base station (e.g., the base station 110), configuration information that indicates one or more first measurement types; and/or means for transmitting, to the base station, periodically and while in an idle mode or an inactive state, first measurements based at least in part on the one or more first measurement types indicated in the configuration information. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a base station (e.g., the base station 110) may include means for transmitting, to a UE (e.g., the UE 120), configuration information that indicates one or more first measurement types; and/or means for receiving, from the UE, periodically and while the UE is in an idle mode or an inactive state, first measurements based at least in part on the one or more first measurement types indicated in the configuration information. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
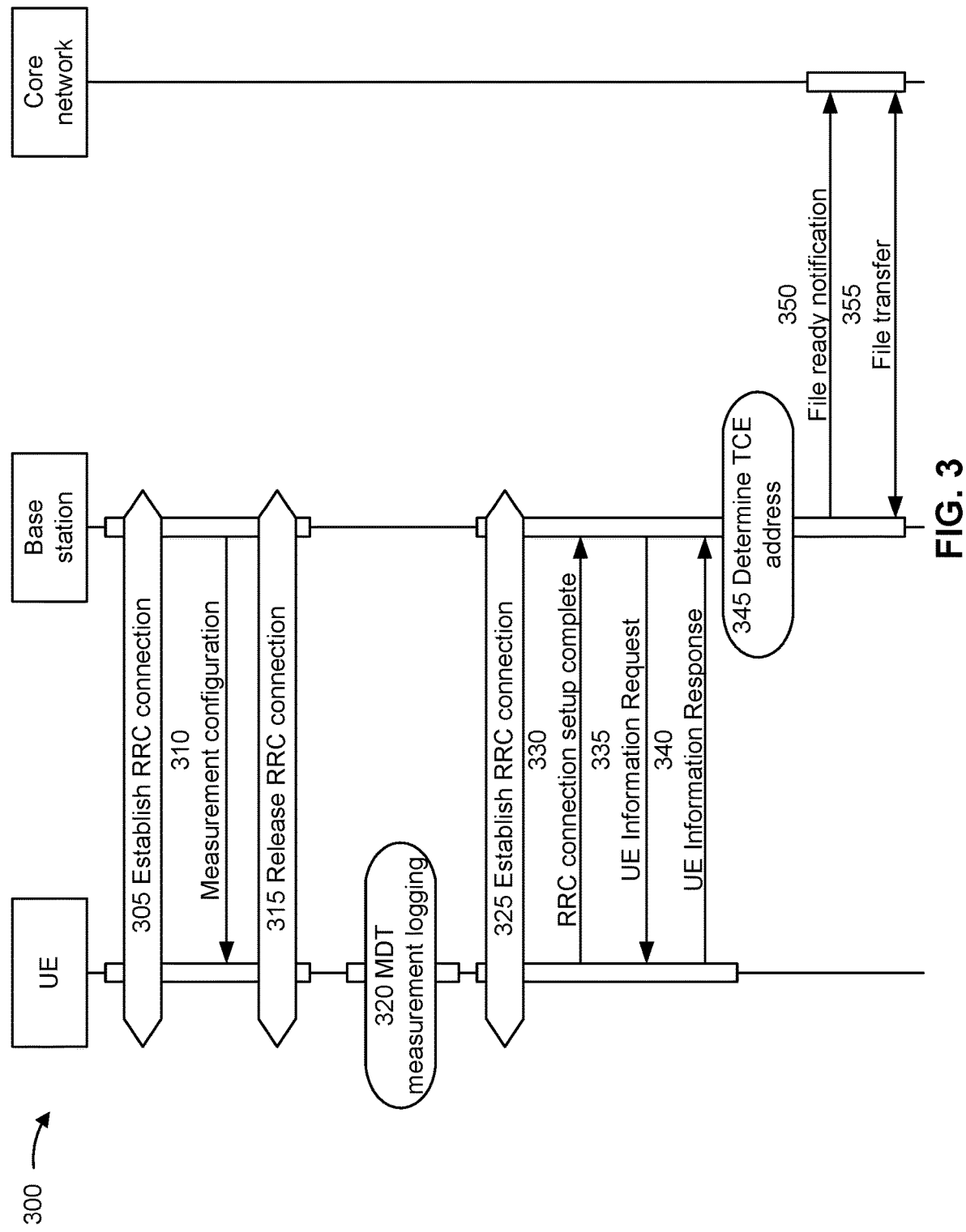
FIG. 3 is a diagram illustrating an example of minimization of drive test (MDT) measurements, in accordance with the present disclosure.

FIG. 3 is a diagram illustrating an example 300 of minimization of drive test (MDT) measurements, in accordance with the present disclosure. As shown in FIG. 3, example 300 includes communication between a base station and a UE. The base station and the UE may communicate on a wireless access link, which may include an uplink and a downlink. As further shown in FIG. 3, example 300 includes communication between a core network and the base station. The core network and the base station may communicate on a wired connection, such as a wireline backhaul, and/or a wireless connection, such as a wireless backhaul.

As shown in connection with reference number 305, the UE and the base station may establish a radio resource control (RRC) connection. For example, the UE may enter a connected mode, which generally consumes more power than an idle mode or an inactive state associated with the UE.

As shown in connection with reference number 310, the base station may transmit, and the UE may receive, a configuration message indicating one or more measurement types for the UE to measure. The one or more measurement types may be MDT measurement types. For example, the base station may indicate a measurement type associated with a serving cell, a measurement type associated with one or more neighboring cells, a measurement type associated with a multicast-broadcast single-frequency network (MBSFN), a measurement type associated with a wireless local area network (WLAN), a measurement type associated with a Bluetooth connection, a measurement type associated with a location of the UE, a measurement type associated with an in-device coexistence, and/or another MDT measurement type. An MDT measurement type may further indicate one or more measurements to be performed, such as RSRP, RSRQ, received signal code power (RSCP), received energy per chip divided by power density (Ec/No), received signal level (Rxlev), block error rate (BLER), and/or another measurement.

As shown in connection with reference number 315, the UE and the base station may release the RRC connection. Accordingly, the UE may enter an idle mode or an inactive state in order to conserve power.

As shown in connection with reference number 320, while in the idle mode or the inactive state, the UE may perform measurements based on the one or more measurement types. Additionally, the UE may write the measurements to a memory of the UE for later transmission to the base station.

As shown in connection with reference number 325, the UE and the base station may reestablish an RRC connection. For example, the UE may again enter a connected mode.

As shown in connection with reference number 330, the UE may indicate, to the base station, that the UE has entered the connected mode. Based at least in part on receiving the indication from the UE, and as shown in connection with reference number 335, the base station may request the measurements for the one or more measurement types. For example, as shown in FIG. 3, the base station may transmit a UE Information Request message as defined in 3GPP specifications and/or another standard.

Based at least in part on receiving the request, and as shown in connection with reference number 340, the UE may transmit the measurements to the base station. For example, as shown in FIG. 3, the UE may transmit a UE Information Response message as defined in 3GPP specifications and/or another standard. Because the measurements are generally large, the UE usually transmits, to the base station, a file that includes all saved measurements (e.g., as described above in connection with reference number 320).

As shown in connection with reference number 345, and after receiving the file with the measurements, the base station may determine an address for a portion of the core network to which the measurements should be sent. For example, the address may be an Internet protocol (IP) address and/or another network-based address. The base station may map an indicator associated with a trace reference, an indicator associated with a trace session, an indicator associated with a trace collection entity (TCE), and/or another indicator, to the address.

As shown in connection with reference number 350, the base station may indicate, to the core network, that the file including the measurements has been received from the UE. Based at least in part on receiving the indication from the base station, and as shown in connection with reference number 355, the core network may provide a link such that the base station transmits, and the core network receives, the file including the measurements for the one or more measurement types.

As indicated above, FIG. 3 is provided as an example. Other examples may differ from what is described with respect to FIG. 3.

Figure 4:
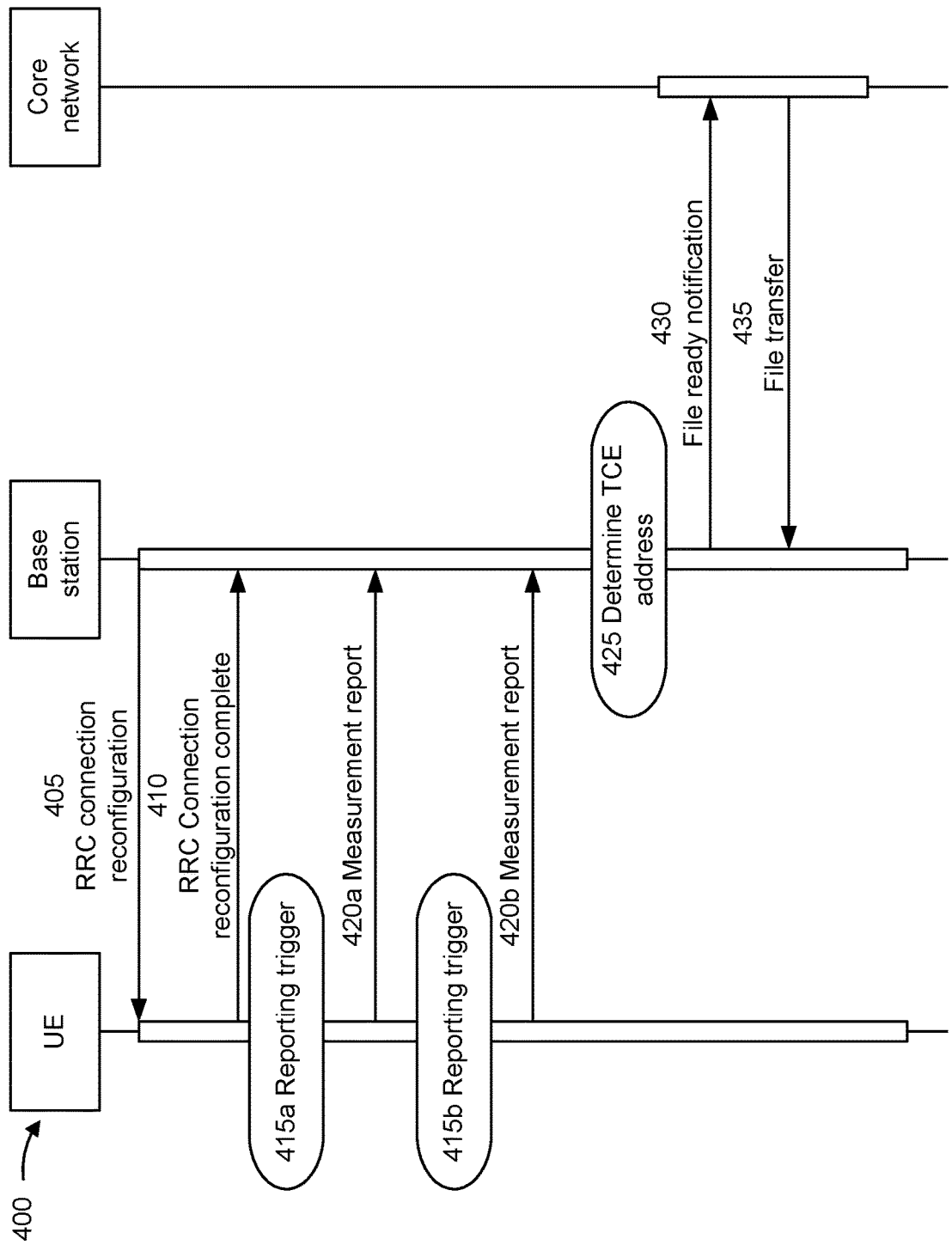
FIG. 4 is a diagram illustrating an example of triggered MDT measurements, in accordance with the present disclosure.

FIG. 4 is a diagram illustrating an example 400 of triggered MDT measurements, in accordance with the present disclosure. As shown in FIG. 4, example 400 includes communication between a base station and a UE. The base station and the UE may communicate on a wireless access link, which may include an uplink and a downlink. As further shown in FIG. 4, example 400 includes communication between a core network and the base station. The core network and the base station may communicate on a wired connection, such as a wireline backhaul, and/or a wireless connection, such as a wireless backhaul.

As shown in connection with reference number 405, the base station may reconfigure an RRC connection with the UE. For example, the UE may enter a connected mode, which generally consumes more power than an idle mode or an inactive state associated with the UE.

The RRC reconfiguration may also indicate one or more measurement types for the UE to measure. The one or more measurement types may be MDT measurement types. For example, the base station may indicate a measurement type associated with a serving cell, a measurement type associated with one or more neighboring cells, a measurement type associated with an MB SFN, a measurement type associated with a WLAN, a measurement type associated with a Bluetooth connection, a measurement type associated with a location of the UE, a measurement type associated with an in-device coexistence, and/or another MDT measurement type. As described above in connection with FIG. 3, an MDT measurement type may further indicate one or more measurements to be performed, such as RSRP, RSRQ, RSCP, Ec/No, Rxlev, BLER, and/or another measurement.

As shown in connection with reference number 410, the UE may indicate, to the base station, that the UE has entered the connected mode. Based on receiving the indication from the UE, and as shown in connection with reference numbers 415a and 420a, the UE may transmit, and the base station may receive, measurement reports associated with the one or more measurement types based on reporting triggers. The triggers may be periodic (e.g., every 1 ms, every 2 ms, and so on) and/or event-based (e.g., when the measurements satisfy one or more thresholds or when the base station transmits an on-demand request for the measurements, among other examples). Although example 400 includes two triggers (shown in connection with reference numbers 415a and 415b) with two corresponding report transmissions from the UE to the base station (shown in connection with reference numbers 420a and 420b), the description similarly applies to any fewer triggers and corresponding report transmissions (e.g., one trigger and one transmission) or to additional triggers and corresponding report transmissions (e.g., three triggers and three transmissions, four triggers and four transmissions, and so on).

Accordingly, by using techniques as described in connection with FIG. 4, the base station may receive measurements from the UE faster and with greater frequency as compared with using techniques described above in connection with FIG. 3. However, in example 400, the UE consumes significantly more power and processing resources, as compared with example 300, because the UE remains in the connected mode throughout rather than performing the measurements while in an idle mode or an inactive state.

As shown in connection with reference number 425, and after receiving the measurements, the base station may determine an address for a portion of the core network to which the measurements should be sent. For example, the address may be an IP address and/or another network-based address. The base station may map an indicator associated with a trace reference, an indicator associated with a trace session, an indicator associated with a TCE, and/or another indicator to the address.

As shown in connection with reference number 430, the base station may indicate, to the core network, that the measurements have been received from the UE. The base station may collate the measurements into a file. Based on receiving the indication from the base station, and as shown in connection with reference number 435, the core network may provide a link such that the base station transmits, and the core network receives, the file including the measurements for the one or more measurement types.

As indicated above, FIG. 4 is provided as an example. Other examples may differ from what is described with respect to FIG. 4.

Figure 5:
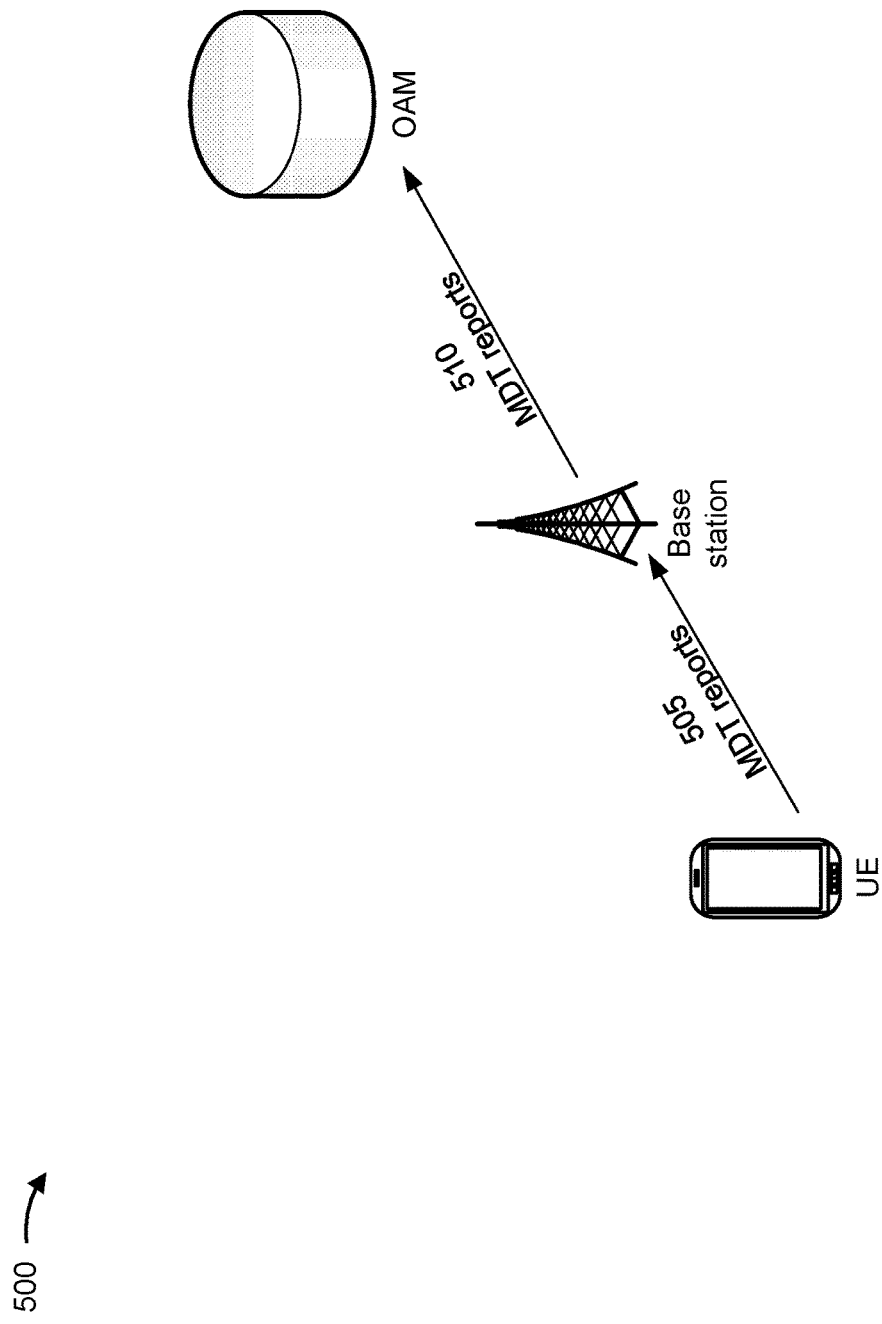
FIG. 5 is a diagram illustrating an example associated with streaming MDT reports to a core network, in accordance with the present disclosure.

FIG. 5 is a diagram illustrating an example 500 associated with streaming MDT reports to a core network, in accordance with the present disclosure. As shown in FIG. 5, example 500 includes communication between a base station and a UE, and between a core network and the base station. The base station and the UE may communicate on a wireless access link, which may include an uplink and a downlink, and the core network and the base station may communicate on a wireless link and/or a wired link (e.g., a backhaul). Although the description focuses on MTD reports transmitted from the UE to the base station and from the base station to the core network, the description similarly applies to other reports transmitted from the UE to the base station and from the base station to the core network.

As shown in connection with reference number 505, the base station may receive MDT reports from the UE. For example, the base station may receive the MDT reports over an RRC connection. As described above in connection with FIG. 3, the MDT reports may be a file including MDT measurements logged over a duration and transmitted to the base station by the UE after the UE returns to a connected state. Additionally, or alternatively, as described above in connection with FIG. 4, the MDT reports may include MDT measurements transmitted to the base station based on a periodicity and/or a triggering event. The base station may collate the MDT measurements into a file before transmitting the file to the core network.

As shown in connection with reference number 510, a portion of the core network, such as an operations, administration, and management (OA&M) entity and/or an operations, administration, and maintenance (OAM) entity, may receive the MDT reports from the base station. The core network may distribute the MDT reports, received at the OAM, to different customers of an operator of the core network (e.g., based on which UE initiated the MDT reports and/or based on different MDT measurement types included in the MDT reports, among other examples). For example, customers may include original equipment manufacturers (OEMs), application developers, and/or Internet service providers (ISPs), among other examples.

The base station may stream the MDT measurements to the core network. For example, the base station may transmit different MDT measurements (e.g., extracted from the file including the MDT reports) to different addresses (e.g., different IP addresses) based at least in part on a trace parameter associated with the UE, a uniform resource identifier (URI) associated with the MDT measurements, and/or hypertext transfer protocol (HTTP) addresses associated with the different customers.

By using streaming techniques as described in connection with FIG. 5, the core network may receive MDT measurements with greater frequency as compared with file transfer techniques as described above in connection with FIGS. 3 and 4. However, the increased speed with which the core network receives the MDT measurements is limited because the UE may provide the MDT measurements to the base station relatively infrequently (e.g., as shown in FIG. 3). As an alternative, the increased speed with which the core network receives the MDT measurements may depend on a significant increase in consumption of power and processing resources by the UE in order to increase the frequency of the MDT measurements (e.g., as shown in FIG. 4).

Some techniques and apparatuses described herein allow a UE (e.g., UE 120) to stream measurements (such as MDT measurements) to a base station (e.g., base station 110) while remaining in an idle mode or an inactive state. Accordingly, the UE 120 may conserve power and processing resources while still providing the measurements faster and with greater frequency to the base station 110. Accordingly, in some aspects, the base station 110 may stream the measurements to a core network supporting the base station 110, such that the core network may receive the measurements from the base station faster and with greater frequency.

As indicated above, FIG. 5 is provided as an example. Other examples may differ from what is described with respect to FIG. 5.

Figure 6:
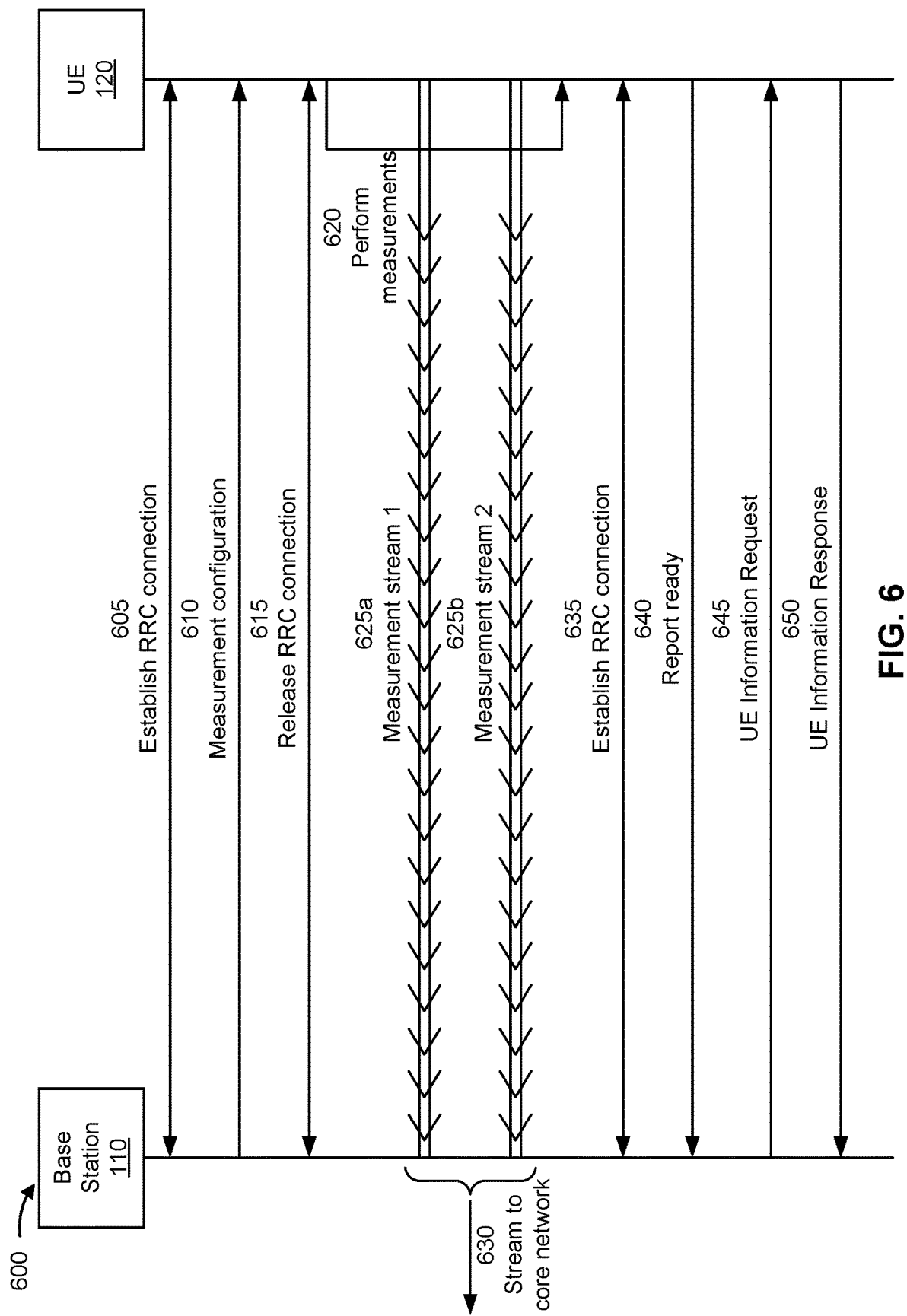
FIG. 6 is a diagram illustrating an example associated with streaming MDT reports from a UE, in accordance with the present disclosure.

FIG. 6 is a diagram illustrating an example 600 of streaming MDT reports from a UE (e.g., UE 120), in accordance with the present disclosure. As shown in FIG. 6, example 600 includes communication between a base station 110 and the UE 120. The base station 110 and the UE 120 may be included in a wireless network, such as wireless network 100 illustrated and described above in connection with FIG. 1. The base station 110 and the UE 120 may communicate on a wireless access link, which may include an uplink and a downlink.

As shown in connection with reference number 605, the base station 110 and the UE 120 may establish an RRC connection. Accordingly, the base station 110 and the UE 120 may be in a connected state. In some aspects, in the connected state, the UE 120 may transmit, and the base station 110 may receive, at least one bit indicating that the UE 120 is capable of streaming the first measurements to the base station. For example, the UE 120 may transmit, and the base station 110 may receive, an MDT StreamingSupport Boolean included in a UE-NR-Capability data structure and/or other similar information included in a similar data structure (e.g., as defined by 33 GPP specifications and/or another standard). Accordingly, in some aspects, the at least one bit may be included in an RRC message from the UE 120.

As shown in connection with reference number 610, the base station 110 may transmit, and the UE 120 may receive, configuration information that indicates one or more first measurement types. In some aspects, the configuration information may be included in an RRC message. For example, the base station 110 may transmit, and the UE 120 may receive, an MDT_Stream_Type octet in an MdtStreamConfiguration data structure. Although the description focuses on the MDT_Stream_Type octet and the MdtStreamConfiguration data structure, the description similarly applies to other information included in a similar data structure (e.g., as defined by 3GPP specifications and/or another standard).

Accordingly, in some aspects, the configuration information may include a string, and one or more bits of the string may indicate the first measurement type(s). For example, the MDT_Stream_Type octet may be a string with eight bits, where each bit corresponds to a measurement type. In some aspects, the leftmost bit may correspond to a measurement type associated with a serving cell and one or more neighboring cells, the next bit may correspond to a measurement type associated with an MBSFN, and other bits may correspond to other measurement types. Accordingly, based on which bits of the string are set to '1' (or set to 'TRUE' or 'ON' or otherwise activated), the UE 120 may determine the first measurement type(s) to stream to the base station 110.

In some aspects, the first measurement type(s) may be associated with an MDT. For example, the first measurement type(s) may include a measurement type associated with a serving cell, a measurement type associated with one or more neighboring cells, a measurement type associated with an MBSFN, a measurement type associated with a WLAN, a measurement type associated with a Bluetooth connection, a measurement type associated with a location of the UE, a measurement type associated with an in-device coexistence, and/or another measurement type.

In some aspects, the configuration information may further indicate a duration associated with measuring the first measurement type(s). For example, the base station 110 may transmit, and the UE 120 may receive, an mdtStreamDuration variable in an MdtStreamConfiguration data structure. Although the description focuses on the mdtStreamDuration variable and the MdtStreamConfiguration data structure, the description similarly applies to other information included in a similar data structure (e.g., as defined by 3GPP specifications and/or another standard). In some aspects, the base station 110 may transmit, and the UE 120 may receive, the duration in the same message as the configuration information or in a different message from the configuration information. The UE 120 may perform measurements for the first measurement type(s) for the indicated duration.

In some aspects, the configuration information may indicate one or more uplink grants for the UE 120 to use to transmit the first measurements to the base station 110. For example, the base station 110 may transmit, and the UE 120 may receive, an MDT Stream UL GrantConfig data structure within an MdtStreamConfiguration data structure. Although the description focuses on the MDT Stream UL GrantConfig data structure and the MdtStreamConfiguration data structure, the description similarly applies to other uplink grant configurations included in a similar data structure (e.g., as defined by 3GPP specifications and/or another standard). In some aspects, the base station 110 may transmit, and the UE 120 may receive, the uplink grant(s) in the same message as the configuration information or in a different message from the configuration information. When the one or more first measurement types include a plurality of first measurement types, the one or more uplink grants may include a plurality of uplink grants. Accordingly, each of the first measurement types may be associated with a corresponding one of the uplink grants (e.g., in a one-to-one relationship). Therefore, each uplink grant may be associated with a relatively small transport block (TB) size.

Additionally with the configuration information, the base station 110 may transmit, and the UE 120 may receive, additional configuration information that indicates one or more additional measurement types. In some aspects, the additional configuration information may be included in an RRC message. For example, the base station 110 may transmit, and the UE 120 may receive, a LoggedMeasurementConfiguration data structure. Although the description focuses on the LoggedMeasurementConfiguration data structure, the description similarly applies to other data structures (e.g., as defined by 3GPP specifications and/or another standard).

In some aspects, the additional measurement type(s) may be associated with an MDT. For example, the one or more additional measurement types may include a measurement type associated with a serving cell, a measurement type associated with one or more neighboring cells, a measurement type associated with an MBSFN, a measurement type associated with a WLAN, a measurement type associated with a Bluetooth connection, a measurement type associated with a location of the UE, a measurement type associated with an in-device coexistence, and/or another measurement type. The additional measurement type(s) may include at least one measurement type that is not included in the first measurement type(s).

In some aspects, the additional configuration information may further indicate a duration for measuring the additional measurement type(s). For example, the base station 110 may transmit, and the UE 120 may receive, a loggingDuration variable in a LoggedMeasurementConfiguration data structure. Although the description focuses on the loggingDuration variable and the LoggedMeasurementConfiguration data structure, the description similarly applies to other information included in a similar data structure (e.g., as defined by 3 GPP specifications and/or another standard). The UE 120 may perform measurements for the additional measurement type(s) for the indicated duration. In some aspects, the loggingDuration variable and the mdtStreamDuration variable may indicate the same duration or different durations. In some aspects, the base station 110 may transmit only one of the loggingDuration variable or the mdtStreamDuration variable when the base station 110 is instructing the UE 120 to measure the first measurement type(s) and the additional measurement type(s) for a same duration.

Based at least in part on the configuration information, in some aspects, the UE 120 may decline to stream the first measurements to the base station 110. For example, the UE 120 may transmit, and the base station 110 may receive, information indicating that the UE 120 is not ready to stream the first measurements to the base station 110. In some aspects, the UE 120 may transmit, and the base station 110 may receive, an mdtStreamingLimitedSupport indication in a UEAssistanceInformation data structure. Although the description focuses on the mdtStreamingLimitedSupport indication and the UEAssistanceInformation data structure, the description similarly applies to other indications included in a similar data structure (e.g., as defined by 3GPP specifications and/or another standard).

In some aspects, the UE 120 may transmit the information indicating that the UE 120 is not ready to stream the first measurements based at least in part on a battery level associated with the UE 120, a temperature associated with the UE 120, a network quality determined by the UE 120 (e.g., an RSRP, a CQI, and/or another indicator of quality associated with the base station 110), a requirement associated with a network serving the UE 120, and/or a requirement associated with an OEM of the UE 120, among other examples. In some aspects, the information transmitted by the UE 120 to the base station 110 (e.g., the mdtStreamingLimitedSupport indication) may indicate a cause of the UE 120 declining to stream the first measurements.

Accordingly, the UE 120 may fall back to a logged measurement procedure. For example, after a duration associated with the configuration information, and similar to operations described below in connection with reference numbers 640, 645, and 650, the UE 120 may transmit, and the base station 110 may receive, a file including one or more first measurements based at least in part on the first measurement type(s). In some aspects, the base station 110 may instruct the UE 120 to fallback. For example, based at least in part on the information indicating that the UE 120 is not ready to stream the first measurements, the base station 110 may transmit, and the UE 120 may receive, new configuration information that instructs the UE 120 to deliver the first measurements in a file after a duration associated with the configuration information, and not periodically. Additionally, or alternatively, the UE 120 may automatically default to the logged measurement procedure after transmitting the information indicating that the UE 120 is not ready to stream the first measurements.

As shown in connection with reference number 615, the UE 120 and the base station 110 may release the RRC connection. For example, the UE 120 may enter an idle mode or an inactive state in which the UE 120 will perform one or more first measurements associated with the first measurement type(s). As described above, unless the UE 120 has performed fallback to the logged measurement procedure, the UE 120 may maintain one or more uplink grants with the base station 110 (e.g., as indicated by the measurement configuration) while in the idle mode or the inactive state.

As shown in connection with reference number 620, the UE 120 may perform the first measurement(s). As described above, the first measurement(s) may be associated with an MDT. For example, the first measurement(s) may include measurements associated with a serving cell, measurements associated with one or more neighboring cells, measurements associated with an MBSFN, measurements associated with a WLAN, measurements associated with a Bluetooth connection, measurements associated with a location of the UE, measurements associated with an in-device coexistence, and/or other measurements.

As shown in connection with reference numbers 625*a* and 625*b*, the UE 120 may transmit, and the base station 110 may receive, periodically and while the UE 120 is in the idle mode or the inactive state, the first measurement(s) based at least in part on the first measurement type(s) indicated in the configuration information. For example, the UE 120 may transmit the first measurement(s) using the uplink grant(s) (e.g., as described above in connection with reference number 610). Additionally, as shown in connection with reference numbers 625*a* and 625*b*, when the one or more first measurements include measurements associated with multiple measurement types, the UE 120 may use different uplink grants corresponding to the different measurement types. Accordingly, the base station 110 may receive the first measurements while the UE 120 remains in the idle mode or the inactive state.

In some aspects, the UE 120 may stream the first measurements in accordance with an interval. For example, the base station 110 may have transmitted (e.g., in the configuration information or separately therefrom), and the UE 120 may have received, an mdtStreamInterval variable in an MdtStreamConfiguration data structure. Although the description focuses on the mdtStreamInterval variable and the MdtStreamConfiguration data structure, the description similarly applies to other information included in a similar data structure (e.g., as defined by 3GPP specifications and/or another standard). When the base station 110 also configures the additional measurement type(s) as described above, the base station 110 may also indicate an interval for performing (but not streaming) one or more additional measurements associated with the additional measurement type(s). For example, the base station 110 may have transmitted (e.g., in the additional configuration information or separately therefrom), and the UE 120 may have received, a loggedInterval variable in a LoggedMeasurementConfiguration data structure. Although the description focuses on the loggedInterval variable and the LoggedMeasurementConfiguration data structure, the description similarly applies to other information included in a similar data structure (e.g., as defined by 3 GPP specifications and/or another standard). In some aspects, the loggedInterval variable and the mdtStreamInterval variable may indicate the same interval or different intervals. In some aspects, the base station 110 may transmit only one of the loggedInterval variable or the mdtStreamInterval variable when the base station 110 is instructing the UE 120 to perform the first measurement(s) and the additional measurement(s) during the same interval.

As shown in connection with reference number 630, the base station 110 may transmit, to a portion of a core network supporting the base station, at least a portion of the first measurement(s). In some aspects, the portion of the core network may include a TCE. The base station 110 may stream the first measurement(s) to the core network. In some aspects, when the first measurements include measurements associated with multiple measurement types, the base station 110 may transmit measurements to different addresses (e.g., different IP addresses) based at least in part on the different measurement types. For example, the base station 110 may map the different measurement types to different addresses based at least in part on a trace parameter associated with the UE, a URI associated with the first measurements, and/or HTTP addresses associated with different customers for the first measurements.

As shown in connection with reference number 635, the UE 120 and the base station 110 may reenter a connected state. For example, the UE 120 and the base station 110 may reestablish an RRC connection.

As described above in connection with reference number 610, in some aspects, the base station 110 may transmit additional configuration information associated with additional measurement type(s). Accordingly, as shown in connection with reference number 640, and after entering the connected state, the UE 120 may transmit, and the base station 110 may receive, an indication that a file, including one or more second measurements based at least in part on one or more second measurement types (e.g., all or a portion of the additional measurement type(s)), is ready.

As shown in connection with reference number 645, the base station 110 may transmit, and the UE 120 may receive, a request for the file. For example, the base station 110 may transmit, and the UE 120 may receive, a UE Information Request message, as defined in 3GPP specifications and/or another standard. In some aspects, the base station 110 may transmit the request based at least in part on receiving the indication from the UE 120 (e.g., as described above in connection with reference number 640). As an alternative, the base station 110 may transmit the request based at least in part on the UE 120 entering the connected state and without receiving the indication from the UE 120.

As shown in connection with reference number 650, after a duration associated with the configuration information, the UE 120 may transmit, and the base station 110 may receive, the file including the second measurement(s) based at least in part on the second measurement type(s). For example, the UE 120 may transmit, and the base station 110 may receive, a UE Information Response message, as defined in 3GPP specifications and/or another standard. As described above in connection with reference number 635, the base station 110 may receive the file while in a connected state with the UE 120. Additionally, in some aspects, the base station 110 may receive the file based at least in part on transmitting the request for the file to the UE 120 (e.g., as described above in connection with reference number 645). As an alternative, the UE 120 may transmit the file based at least in part on the UE 120 entering the connected state and/or after transmitting the indication that the file is ready to the base station 110, and without receiving the request from the base station 110.

Additionally with, or alternatively to, transmitting the file (e.g., as described above in connection with reference numbers 640, 645, and 650), the UE 120 may stream the second measurement(s) to the base station 110. For example, the base station 110 may transmit, and the UE 120 may receive, a request associated with a second measurement type (e.g., included in the additional measurement type(s)). Accordingly, the UE 120 may transmit, and the base station 110 may receive, the second measurement(s) based at least in part on the request. The UE 120 may therefore stream the second measurements similarly to streaming the first measurements, but while in the connected state and based at least in part on an on-demand basis rather than in real-time (e.g., periodically).

In some aspects, after receiving the second measurements, the base station 110 may additionally transmit, and the UE 120 may receive, another request associated with a third measurement type (e.g., included in the additional measurement type(s)). Accordingly, the UE 120 may transmit, and the base station 110 may receive, one or more third measurements based at least in part on the request. The UE 120 may therefore stream the third measurement(s) similarly to streaming the second measurements. Although the description above focuses on streaming measurements for the second measurement type and the third measurement type in the connected state, the UE 120 may instead stream measurements for fewer measurement types (e.g., only the second measurement type) or for more measurement types (e.g., the second measurement type, the third measurement type, a fourth measurement type, and so on) based at least in part on the additional configuration information from the base station 110 (e.g., as described above in connection with reference number 610).

By using techniques as described in connection with FIG. 6, the UE 120 may stream measurements (such as MDT measurements) to the base station 110 while remaining in an idle mode or an inactive state. Accordingly, the UE 120 may conserve power while still providing the measurements faster and with greater frequency to the base station 110. Additionally, in some aspects, the base station 110 may stream the measurements to a core network supporting the base station 110, such the core network receives the measurements from the base station 110 faster and with greater frequency.

As indicated above, FIG. 6 is provided as an example. Other examples may differ from what is described with respect to FIG. 6.

Figure 7:
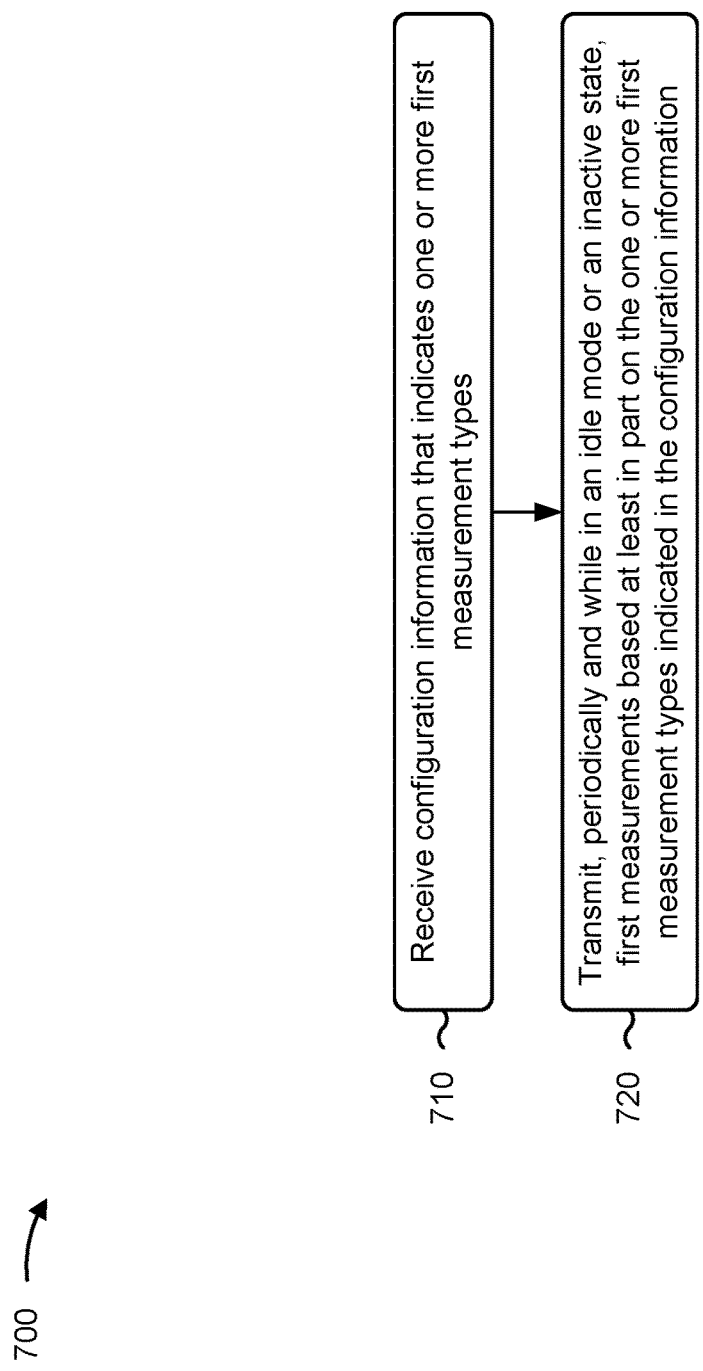
FIG. 7 is a diagram illustrating an example process executed by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with periodic streaming of reports from the UE.

As shown in FIG. 7, in some aspects, process 700 may include receiving, from a base station (e.g., base station 110), configuration information that indicates one or more first measurement types (block 710). For example, the UE (e.g., using antenna 252, demodulator 254, MIMO detector 256, receive processor 258, controller/processor 280, and/or memory 282) may receive, from the base station, configuration information that indicates one or more first measurement types, as described herein.

As further shown in FIG. 7, in some aspects, process 700 may include transmitting, to the base station, periodically and while in an idle mode or an inactive state, first measurements based at least in part on the one or more first measurement types indicated in the configuration information (block 720). For example, the UE (e.g., using antenna 252, transmit processor 264, TX MIMO processor 266, modulator 254, controller/processor 280, and/or memory 282) may transmit, to the base station, periodically and while in an idle mode or an inactive state, first measurements based at least in part on the one or more first measurement types indicated in the configuration information, as described herein.

Process 700 may include additional aspects, such as any single aspect or any combination of aspects described below and/or in connection with one or more other processes described elsewhere herein.

In a first aspect, process 700 further includes transmitting (e.g., using antenna 252, transmit processor 264, TX MIMO processor 266, modulator 254, controller/processor 280, and/or memory 282), to the base station, at least one bit indicating that the UE is capable of streaming the first measurements to the base station.

In a second aspect, alone or in combination with the first aspect, the at least one bit is included in an RRC message.

In a third aspect, alone or in combination with one or more of the first and second aspects, the configuration information is included in an RRC message.

In a fourth aspect, alone or in combination with one or more of the first through third aspects, the configuration information includes a string, and one or more bits of the string indicate the one or more first measurement types.

In a fifth aspect, alone or in combination with one or more of the first through fourth aspects, the configuration information further indicates a duration associated with measuring the one or more first measurement types.

In a sixth aspect, alone or in combination with one or more of the first through fifth aspects, process 700 further includes transmitting (e.g., using antenna 252, transmit processor 264, TX MIMO processor 266, modulator 254, controller/processor 280, and/or memory 282), to the base station, information indicating that the UE is not ready to stream the first measurements to the base station.

In a seventh aspect, alone or in combination with one or more of the first through sixth aspects, the information, indicating that the UE is not ready to stream the first measurements, is transmitted based at least in part on a battery level associated with the UE, a temperature associated with the UE, a network quality determined by the UE, a requirement associated with a network serving the UE, a requirement associated with an OEM of the UE, or a combination thereof.

In an eighth aspect, alone or in combination with one or more of the first through seventh aspects, process 700 further includes transmitting (e.g., using antenna 252, transmit processor 264, TX MIMO processor 266, modulator 254, controller/processor 280, and/or memory 282), to the base station and after a duration associated with the configuration information, a file including the first measurements based at least in part on the one or more first measurement types, based at least in part on transmitting the information indicating that the UE is not ready to stream the first measurements.

In a ninth aspect, alone or in combination with one or more of the first through eighth aspects, the configuration information further indicates one or more uplink grants, and the first measurements are transmitted based at least in part on the one or more uplink grants.

In a tenth aspect, alone or in combination with one or more of the first through ninth aspects, the one or more first measurement types include a plurality of first measurement types, the one or more uplink grants include a plurality of uplink grants, and each of the first measurement types is associated with a corresponding one of the uplink grants.

In an eleventh aspect, alone or in combination with one or more of the first through tenth aspects, process 700 further includes transmitting (e.g., using antenna 252, transmit processor 264, TX MIMO processor 266, modulator 254, controller/processor 280, and/or memory 282), to the base station and after a duration associated with the configuration information, a file including second measurements based at least in part on one or more second measurement types.

In a twelfth aspect, alone or in combination with one or more of the first through eleventh aspects, the file is transmitted while the UE is in a connected state with the base station.

In a thirteenth aspect, alone or in combination with one or more of the first through twelfth aspects, process 700 further includes transmitting (e.g., using antenna 252, transmit processor 264, TX MIMO processor 266, modulator 254, controller/processor 280, and/or memory 282), to the base station, an indication that the file is ready, and receiving (e.g., using antenna 252, demodulator 254, MIMO detector 256, receive processor 258, controller/processor 280, and/or memory 282), from the base station, a request for the file, based at least in part on transmitting the indication, such that the file is transmitted based at least in part on receiving the request for the file.

In a fourteenth aspect, alone or in combination with one or more of the first through thirteenth aspects, process 700 further includes transmitting (e.g., using antenna 252, transmit processor 264, TX MIMO processor 266, modulator 254, controller/processor 280, and/or memory 282), to the base station and after a duration associated with the configuration information, second measurements based at least in part on a second measurement type.

In a fifteenth aspect, alone or in combination with one or more of the first through fourteenth aspects, the second measurements are transmitted while the UE is in a connected state with the base station.

In a sixteenth aspect, alone or in combination with one or more of the first through fifteenth aspects, process 700 further includes receiving (e.g., using antenna 252, demodulator 254, MIMO detector 256, receive processor 258, controller/processor 280, and/or memory 282), from the base station, a request associated with the second measurement type, such that the second measurements are transmitted based at least in part on receiving the request.

In a seventeenth aspect, alone or in combination with one or more of the first through sixteenth aspects, process 700 further includes receiving (e.g., using antenna 252, demodulator 254, MIMO detector 256, receive processor 258, controller/processor 280, and/or memory 282), from the base station and after transmitting the second measurements, another request associated with a third measurement type, and transmitting (e.g., using antenna 252, transmit processor 264, TX MIMO processor 266, modulator 254, controller/processor 280, and/or memory 282), to the base station and based at least in part on receiving the request associated with the third measurement type, third measurements based at least in part on the third measurement type.

In an eighteenth aspect, alone or in combination with one or more of the first through seventeenth aspects, the one or more first measurement types include at least one of a measurement type associated with a serving cell, a measurement type associated with one or more neighboring cells, a measurement type associated with an MB SFN, a measurement type associated with a WLAN, a measurement type associated with a Bluetooth connection, a measurement type associated with a location of the UE, a measurement type associated with an in-device coexistence, or a combination thereof.

In a nineteenth aspect, alone or in combination with one or more of the first through eighteenth aspects, the one or more first measurement types are associated with an MDT.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
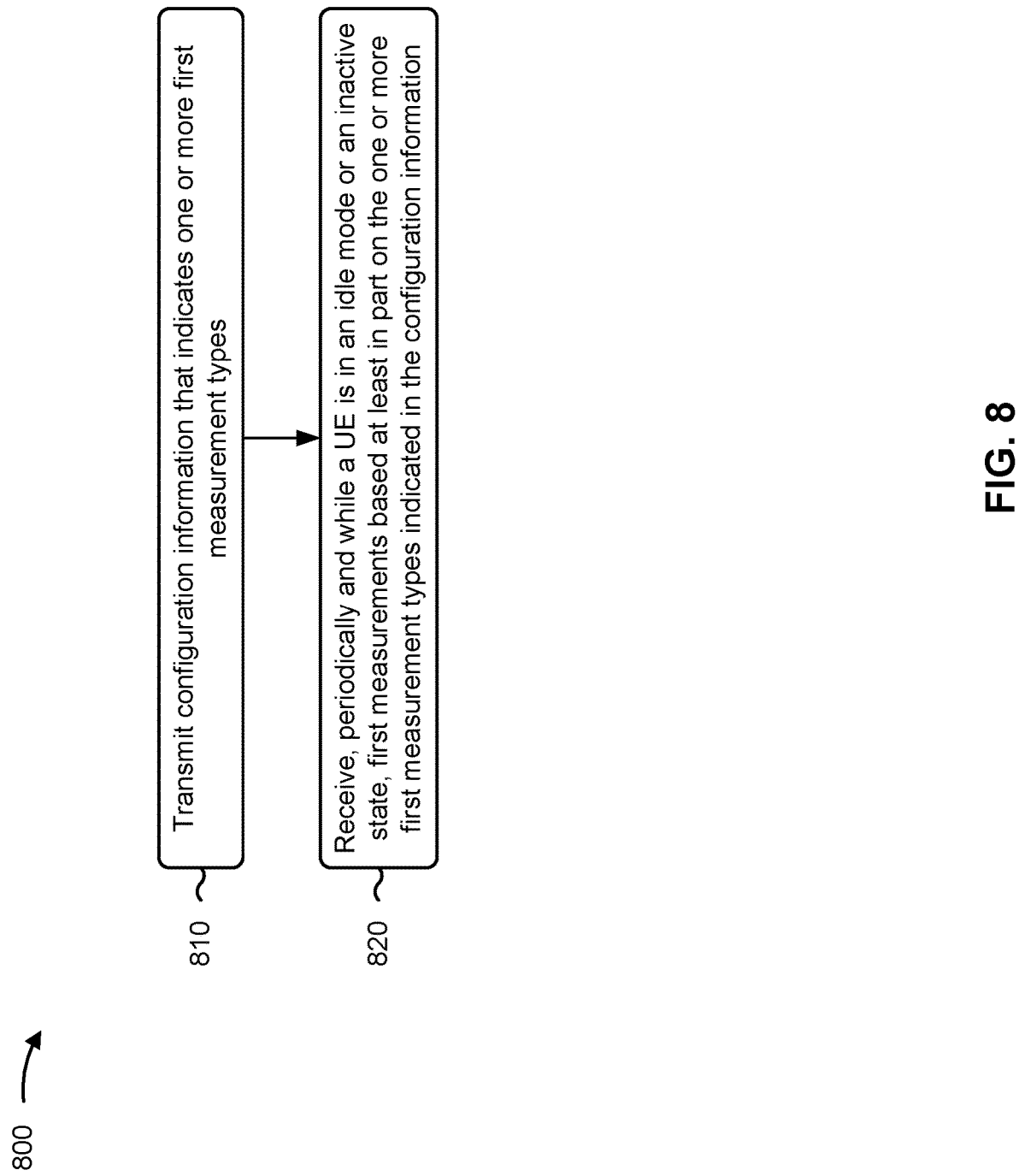
FIG. 8 is a diagram illustrating an example process executed by a base station, in accordance with the present disclosure.

FIG. 8 is a diagram illustrating an example process 800 performed, for example, by a base station, in accordance with the present disclosure. Example process 800 is an example where the base station (e.g., base station 110) performs operations associated with periodic streaming of reports from a UE (e.g., UE 120).

As shown in FIG. 8, in some aspects, process 800 may include transmitting, to the UE, configuration information that indicates one or more first measurement types (block 810). For example, the base station (e.g., using transmit processor 220, TX MIMO processor 230, modulator 232, antenna 234, controller/processor 240, memory 242, and/or scheduler 246) may transmit, to the UE, configuration information that indicates one or more first measurement types, as described herein.

As further shown in FIG. 8, in some aspects, process 800 may include receiving, from the UE, periodically and while the UE is in an idle mode or an inactive state, first measurements based at least in part on the one or more first measurement types indicated in the configuration information (block 820). For example, the base station (e.g., using antenna 234, demodulator 232, MIMO detector 236, receive processor 238, controller/processor 240, and/or memory 242) may receive, from the UE, periodically and while the UE is in an idle mode or an inactive state, first measurements based at least in part on the one or more first measurement types indicated in the configuration information, as described herein.

Process 800 may include additional aspects, such as any single aspect or any combination of aspects described below and/or in connection with one or more other processes described elsewhere herein.

In a first aspect, process 800 further includes receiving (e.g., using antenna 234, demodulator 232, MIMO detector 236, receive processor 238, controller/processor 240, and/or memory 242), from the UE, at least one bit indicating that the UE is capable of streaming the first measurements to the base station.

In a second aspect, alone or in combination with the first aspect, the at least one bit is included in an RRC message.

In a third aspect, alone or in combination with one or more of the first and second aspects, the configuration information is included in an RRC message.

In a fourth aspect, alone or in combination with one or more of the first through third aspects, the configuration information includes a string, and one or more bits of the string indicate the one or more first measurement types.

In a fifth aspect, alone or in combination with one or more of the first through fourth aspects, the configuration information further indicates a duration associated with measuring the one or more first measurement types.

In a sixth aspect, alone or in combination with one or more of the first through fifth aspects, process 800 includes further receiving (e.g., using antenna 234, demodulator 232, MIMO detector 236, receive processor 238, controller/processor 240, and/or memory 242), from the UE, information indicating that the UE is not ready to stream the first measurements to the base station.

In a seventh aspect, alone or in combination with one or more of the first through sixth aspects, process 800 further includes transmitting (e.g., using transmit processor 220, TX MIMO processor 230, modulator 232, antenna 234, controller/processor 240, memory 242, and/or scheduler 246), to the UE and based at least in part on receiving the information indicating that the UE is not ready to stream the first measurements, new configuration information that instructs the UE to deliver the first measurements in a file after a duration associated with the configuration information, and not periodically.

In an eighth aspect, alone or in combination with one or more of the first through seventh aspects, process 800 further includes receiving (e.g., using antenna 234, demodulator 232, MIMO detector 236, receive processor 238, controller/processor 240, and/or memory 242), from the UE and after a duration associated with the configuration information, a file including the first measurements based at least in part on the one or more first measurement types, based at least in part on receiving the information indicating that the UE is not ready to stream the first measurements.

In a ninth aspect, alone or in combination with one or more of the first through eighth aspects, the configuration information further indicates one or more uplink grants, and the first measurements are received, periodically and while the UE is in the idle mode or the inactive state, based at least in part on the one or more uplink grants.

In a tenth aspect, alone or in combination with one or more of the first through ninth aspects, the one or more first measurement types include a plurality of first measurement types, the one or more uplink grants include a plurality of uplink grants, and each of the first measurement types is associated with a corresponding one of the uplink grants.

In an eleventh aspect, alone or in combination with one or more of the first through tenth aspects, process 800 further includes receiving (e.g., using antenna 234, demodulator 232, MIMO detector 236, receive processor 238, controller/processor 240, and/or memory 242), from the UE and after a duration associated with the configuration information, a file including second measurements based at least in part on one or more second measurement types.

In a twelfth aspect, alone or in combination with one or more of the first through eleventh aspects, the file is received while the base station is in a connected state with the UE.

In a thirteenth aspect, alone or in combination with one or more of the first through twelfth aspects, process 800 further includes receiving (e.g., using antenna 234, demodulator 232, MIMO detector 236, receive processor 238, controller/processor 240, and/or memory 242), from the UE, an indication that the file is ready, and transmitting (e.g., using transmit processor 220, TX MIMO processor 230, modulator 232, antenna 234, controller/processor 240, memory 242, and/or scheduler 246), to the UE, a request for the file, based at least in part on receiving the indication, such that the file is received based at least in part on transmitting the request for the file.

In a fourteenth aspect, alone or in combination with one or more of the first through thirteenth aspects, process 800 further includes receiving (e.g., using antenna 234, demodulator 232, MIMO detector 236, receive processor 238, controller/processor 240, and/or memory 242), from the UE and after a duration associated with the configuration information, second measurements based at least in part on a second measurement type.

In a fifteenth aspect, alone or in combination with one or more of the first through fourteenth aspects, the second measurements are received while the base station is in a connected state with the UE.

In a sixteenth aspect, alone or in combination with one or more of the first through fifteenth aspects, process 800 includes transmitting (e.g., using transmit processor 220, TX MIMO processor 230, modulator 232, antenna 234, controller/processor 240, memory 242, and/or scheduler 246), to the UE, a request associated with the second measurement type, such that the second measurements are received based at least in part on transmitting the request.

In a seventeenth aspect, alone or in combination with one or more of the first through sixteenth aspects, process 800 further includes transmitting (e.g., using transmit processor 220, TX MIMO processor 230, modulator 232, antenna 234, controller/processor 240, memory 242, and/or scheduler 246), to the UE and after receiving the second measurements, another request associated with a third measurement type, and receiving (e.g., using antenna 234, demodulator 232, MIMO detector 236, receive processor 238, controller/processor 240, and/or memory 242), from the UE and based at least in part on transmitting the request associated with the third measurement type, third measurements based at least in part on the third measurement type.

In an eighteenth aspect, alone or in combination with one or more of the first through seventeenth aspects, the one or more first measurement types include at least one of a measurement type associated with a serving cell, a measurement type associated with one or more neighboring cells, a measurement type associated with an MB SFN, a measurement type associated with a WLAN, a measurement type associated with a Bluetooth connection, a measurement type associated with a location of the UE, a measurement type associated with an in-device coexistence, or a combination thereof.

In a nineteenth aspect, alone or in combination with one or more of the first through eighteenth aspects, the one or more first measurement types are associated with an MDT.

In a twentieth aspect, alone or in combination with one or more of the first through nineteenth aspects, process 800 further includes transmitting (e.g., using transmit processor 220, controller/processor 240, memory 242, communications unit 244, and/or scheduler 246), to a portion of a core network supporting the base station, at least a portion of the first measurements.

In a twenty-first aspect, alone or in combination with one or more of the first through twentieth aspects, the portion of the core network includes a TCE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: receiving, from a base station, configuration information that indicates one or more first measurement types; and transmitting, to the base station, periodically and while in an idle mode or an inactive state, first measurements based at least in part on the one or more first measurement types indicated in the configuration information.

Aspect 2: The method of Aspect 1, further comprising: transmitting, to the base station, at least one bit indicating that the UE is capable of streaming the first measurements to the base station.

Aspect 3: The method of Aspect 2, wherein the at least one bit is included in a radio resource control message.

Aspect 4: The method of any of Aspects 1 through 3, wherein the configuration information is included in a radio resource control message.

Aspect 5: The method of any of Aspects 1 through 4, wherein the configuration information includes a string, and one or more bits of the string indicate the one or more first measurement types.

Aspect 6: The method of any of Aspects 1 through 5, wherein the configuration information further indicates a duration associated with measuring the one or more first measurement types.

Aspect 7: The method of any of Aspects 1 through 6, wherein the configuration information further indicates one or more uplink grants, the first measurements are transmitted based at least in part on the one or more uplink grants.

Aspect 8: The method of Aspect 7, wherein the one or more first measurement types include a plurality of first measurement types, the one or more uplink grants include a plurality of uplink grants, and each of the first measurement types is associated with a corresponding one of the uplink grants.

Aspect 9: The method of any of Aspects 1 through 8, further comprising: transmitting, to the base station and after a duration associated with the configuration information, a file including second measurements based at least in part on one or more second measurement types.

Aspect 10: The method of Aspect 9, wherein the file is transmitted while the UE is in a connected state with the base station.

Aspect 11: The method of any of Aspects 9 through 10, further comprising: transmitting, to the base station, an indication that the file is ready; and receiving, from the base station, a request for the file, based at least in part on transmitting the indication, wherein the file is transmitted based at least in part on receiving the request for the file.

Aspect 12: The method of any of Aspects 1 through 8, further comprising: transmitting, to the base station and after a duration associated with the configuration information, second measurements based at least in part on a second measurement type.

Aspect 13: The method of Aspect 12, wherein the second measurements are transmitted while the UE is in a connected state with the base station.

Aspect 14: The method of any of Aspects 12 through 13, further comprising: receiving, from the base station, a request associated with the second measurement type, wherein the second measurements are transmitted based at least in part on receiving the request.

Aspect 15: The method of Aspect 14, further comprising: receiving, from the base station and after transmitting the second measurements, another request associated with a third measurement type; and transmitting, to the base station and based at least in part on receiving the request associated with the third measurement type, third measurements based at least in part on the third measurement type.

Aspect 16: The method of Aspect 1, further comprising: transmitting, to the base station, information indicating that the UE is not ready to stream the first measurements to the base station.

Aspect 17: The method of Aspect 16, wherein the information, indicating that the UE is not ready to stream the first measurements, is transmitted based at least in part on a battery level associated with the UE, a temperature associated with the UE, a network quality determined by the UE, a requirement associated with a network serving the UE, a requirement associated with an original equipment manufacturer of the UE, or a combination thereof.

Aspect 18: The method of any of Aspects 16 through 17, further comprising: transmitting, to the base station and after a duration associated with the configuration information, a file including the first measurements based at least in part on the one or more first measurement types, based at least in part on transmitting the information indicating that the UE is not ready to stream the first measurements.

Aspect 19: The method of any of Aspects 1 through 18, wherein the one or more first measurement types include at least one of: a measurement type associated with a serving cell, a measurement type associated with one or more neighboring cells, a measurement type associated with a multicast-broadcast single-frequency network, a measurement type associated with a wireless local area network, a measurement type associated with a Bluetooth connection, a measurement type associated with a location of the UE, a measurement type associated with an in-device coexistence, or a combination thereof.

Aspect 20: The method of any of Aspects 1 through 19, wherein the one or more first measurement types are associated with a minimization of drive test.

Aspect 21: A method of wireless communication performed by a base station, comprising: transmitting, to a user equipment (UE), configuration information that indicates one or more first measurement types; and receiving, from the UE, periodically and while the UE is in an idle mode or an inactive state, first measurements based at least in part on the one or more first measurement types indicated in the configuration information.

Aspect 22: The method of Aspect 21, further comprising: receiving, from the UE, at least one bit indicating that the UE is capable of streaming the first measurements to the base station.

Aspect 23: The method of Aspect 22, wherein the at least one bit is included in a radio resource control message.

Aspect 24: The method of any of Aspects 21 through 23, wherein the configuration information is included in a radio resource control message.

Aspect 25: The method of any of Aspects 21 through 24, wherein the configuration information includes a string, and one or more bits of the string indicate the one or more first measurement types.

Aspect 26: The method of any of Aspects 21 through 25, wherein the configuration information further indicates a duration associated with measuring the one or more first measurement types.

Aspect 27: The method of any of Aspects 21 through 26, wherein the configuration information further indicates one or more uplink grants, and the first measurements are received, periodically and while the UE is in the idle mode or the inactive state, based at least in part on the one or more uplink grants.

Aspect 28: The method of Aspect 27, wherein the one or more first measurement types include a plurality of first measurement types, the one or more uplink grants include a plurality of uplink grants, and each of the first measurement types is associated with a corresponding one of the uplink grants.

Aspect 29: The method of any of Aspects 21 through 28, further comprising: receiving, from the UE and after a duration associated with the configuration information, a file including second measurements based at least in part on one or more second measurement types.

Aspect 30: The method of Aspect 29, wherein the file is received while the base station is in a connected state with the UE.

Aspect 31: The method of any of Aspects 29 through 30, further comprising: receiving, from the UE, an indication that the file is ready; and transmitting, to the UE a request for the file, based at least in part on receiving the indication, wherein the file is received based at least in part on transmitting the request for the file.

Aspect 32: The method of any of Aspects 21 through 28, further comprising: receiving, from the UE and after a duration associated with the configuration information, second measurements based at least in part on a second measurement type.

Aspect 33: The method of Aspect 32, wherein the second measurements are received while the base station is in a connected state with the UE.

Aspect 34: The method of any of Aspects 32 through 33, further comprising: transmitting, to the UE, a request associated with the second measurement type, wherein the second measurements are received based at least in part on transmitting the request.

Aspect 35: The method of Aspect 34, further comprising: transmitting, to the UE and after receiving the second measurements, another request associated with a third measurement type; and receiving, from the UE and based at least in part on transmitting the request associated with the third measurement type, third measurements based at least in part on the third measurement type.

Aspect 36: The method of Aspect 21, further comprising: receiving, from the UE, information indicating that the UE is not ready to stream the first measurements to the base station.

Aspect 37: The method of Aspect 36, further comprising: transmitting, to the UE and based at least in part on receiving the information indicating that the UE is not ready to stream the first measurements, new configuration information that instructs the UE to deliver the first measurements in a file after a duration associated with the configuration information, and not periodically.

Aspect 38: The method of any of Aspects 36 through 37, further comprising: receiving, from the UE and after a duration associated with the configuration information, a file including the first measurements based at least in part on the one or more first measurement types, based at least in part on receiving the information indicating that the UE is not ready to stream the first measurements.

Aspect 39: The method of any of Aspects 21 through 38, wherein the one or more first measurement types include at least one of: a measurement type associated with a serving cell, a measurement type associated with one or more neighboring cells, a measurement type associated with a multicast-broadcast single-frequency network, a measurement type associated with a wireless local area network, a measurement type associated with a Bluetooth connection, a measurement type associated with a location of the UE, a measurement type associated with an in-device coexistence, or a combination thereof.

Aspect 40: The method of any of Aspects 21 through 39, wherein the one or more first measurement types are associated with a minimization of drive test.

Aspect 41: The method of any of Aspects 21 through 40, further comprising: transmitting, to a portion of a core network supporting the base station, at least a portion of the first measurements.

Aspect 42: The method of Aspect 41, wherein the portion of the core network includes a trace collection entity.

Aspect 43: An apparatus for wireless communication at a device, comprising a processor; memory coupled with the processor; and instructions stored in the memory and executable by the processor to cause the apparatus to perform the method of one or more of Aspects 1-20.

Aspect 44: A device for wireless communication, comprising a memory and one or more processors coupled to the memory, the one or more processors configured to perform the method of one or more of Aspects 1-20.

Aspect 45: An apparatus for wireless communication, comprising at least one means for performing the method of one or more of Aspects 1-20.

Aspect 46: A non-transitory computer-readable medium storing code for wireless communication, the code comprising instructions executable by a processor to perform the method of one or more of Aspects 1-20.

Aspect 47: A non-transitory computer-readable medium storing a set of instructions for wireless communication, the set of instructions comprising one or more instructions that, when executed by one or more processors of a device, cause the device to perform the method of one or more of Aspects 1-20.

Aspect 48: An apparatus for wireless communication at a device, comprising a processor; memory coupled with the processor; and instructions stored in the memory and executable by the processor to cause the apparatus to perform the method of one or more of Aspects 21-42.

Aspect 49: A device for wireless communication, comprising a memory and one or more processors coupled to the memory, the one or more processors configured to perform the method of one or more of Aspects 21-42.

Aspect 50: An apparatus for wireless communication, comprising at least one means for performing the method of one or more of Aspects 21-42.

Aspect 51: A non-transitory computer-readable medium storing code for wireless communication, the code comprising instructions executable by a processor to perform the method of one or more of Aspects 21-42.

Aspect 52: A non-transitory computer-readable medium storing a set of instructions for wireless communication, the set of instructions comprising one or more instructions that, when executed by one or more processors of a device, cause the device to perform the method of one or more of Aspects 21-42.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the memory and the one or more processors configured to cause the UE to:
      receive, from a base station, configuration information that indicates one or more first measurement types;
      transmit, to the base station, periodically and while in an idle mode or an inactive state, first measurements based at least in part on the one or more first measurement types indicated in the configuration information; and
      transmit, to the base station, information indicating that the UE is not ready to stream the first measurements to the base station, wherein the information, indicating that the UE is not ready to stream the first measurements, is transmitted based at least in part on a temperature associated with the UE, a requirement associated with an original equipment manufacturer of the UE, or a combination thereof.

2. The UE of claim 1, wherein the memory and the one or mor processors are further configured to cause the UE to: configured to cause the UE to:
   transmit, to the base station, at least one bit indicating that the UE is capable of streaming the first measurements to the base station.

3. The UE of claim 2, wherein the at least one bit is included in a radio resource control message.

4. The UE of claim 1, wherein the configuration information is included in a radio resource control message.

5. The UE of claim 1, wherein the configuration information includes a string, and one or more bits of the string indicate the one or more first measurement types.

6. The UE of claim 1, wherein the configuration information further indicates a duration associated with measuring the one or more first measurement types.

7. The UE of claim 1, wherein the memory and the one or more processors are further configured to cause the UE to:
   transmit, to the base station and after a duration associated with the configuration information, a file including the first measurements based at least in part on the one or more first measurement types, based at least in part on transmitting the information indicating that the UE is not ready to stream the first measurements.

8. The UE of claim 1, wherein the configuration information further indicates one or more uplink grants, and the first measurements are transmitted based at least in part on the one or more uplink grants.

9. The UE of claim 8, wherein the one or more first measurement types include a plurality of first measurement types, the one or more uplink grants include a plurality of uplink grants, and each of the first measurement types is associated with a corresponding one of the uplink grants.

10. The UE of claim 1, wherein the memory and the one or more processors are further configured to cause the UE to:
    transmit, to the base station and after a duration associated with the configuration information, a file including second measurements based at least in part on one or more second measurement types.

11. The UE of claim 10, wherein the file is transmitted while the UE is in a connected state with the base station.

12. The UE of claim 10, wherein the memory and the one or more processors are further configured to cause the UE to:
    transmit, to the base station, an indication that the file is ready; and
    receive, from the base station, a request for the file, based at least in part on transmitting the indication,
    wherein the file is transmitted based at least in part on receiving the request for the file.

13. The UE of claim 1, wherein the memory and the one or more processors are further configured to cause the UE to:
    transmit, to the base station and after a duration associated with the configuration information, second measurements based at least in part on a second measurement type.

14. The UE of claim 13, wherein the second measurements are transmitted while the UE is in a connected state with the base station.

15. The UE of claim 13, wherein the memory and the one or more processors are further configured to cause the UE to:
    receive, from the base station, a request associated with the second measurement type,
    wherein the second measurements are transmitted based at least in part on receiving the request.

16. The UE of claim 15, wherein the memory and the one or more processors are further configured to cause the UE to:
    receive, from the base station and after transmitting the second measurements, another request associated with a third measurement type; and transmit, to the base station and based at least in part on receiving the request associated with the third measurement type, third measurements based at least in part on the third measurement type.

17. The UE of claim 1, wherein the one or more first measurement types include at least one of:
a measurement type associated with a serving cell,
a measurement type associated with one or more neighboring cells,
a measurement type associated with a multicast-broadcast single-frequency network,
a measurement type associated with a wireless local area network,
a measurement type associated with a Bluetooth connection,
a measurement type associated with a location of the UE,
a measurement type associated with an in-device coexistence,
or a combination thereof.

18. The UE of claim 1, wherein the one or more first measurement types are associated with a minimization of drive test.

19. A base station for wireless communication, comprising:
a memory; and
one or more processors coupled to the memory, the memory and the one or more processors configured to cause the base station to:
transmit, to a user equipment (UE), configuration information that indicates one or more first measurement types;
receive, from the UE, periodically and while the UE is in an idle mode or an inactive state, first measurements based at least in part on the one or more first measurement types indicated in the configuration information;
receive, from the UE, information indicating that the UE is not ready to stream the first measurements to the base station; and
receive, from the UE and after a duration associated with the configuration information, a file including the first measurements based at least in part on the one or more first measurement types, based at least in part on receiving the information indicating that the UE is not ready to stream the first measurements.

20. The base station of claim 19, wherein the memory and the one or more processors are further configured to cause the base station to:
transmit, to a portion of a core network supporting the base station, at least a portion of the first measurements.

21. The base station of claim 20, wherein the portion of the core network includes a trace collection entity.

22. A method of wireless communication performed by a user equipment (UE), comprising:
receiving, from a base station, configuration information that indicates one or more first measurement types;
transmitting, to the base station, periodically and while in an idle mode or an inactive state, first measurements based at least in part on the one or more first measurement types indicated in the configuration information; and
transmitting, to the base station, information indicating that the UE is not ready to stream the first measurements to the base station, wherein the information, indicating that the UE is not ready to stream the first measurements, is transmitted based at least in part on a temperature associated with the UE, a requirement associated with an original equipment manufacturer of the UE, or a combination thereof.

23. The method of claim 22, wherein the one or more first measurement types include a plurality of first measurement types, the configuration information further indicates a plurality of uplink grants, the first measurements are transmitted based at least in part on the plurality of uplink grants, and each of the first measurement types is associated with a corresponding one of the uplink grants.

24. The method of claim 22, further comprising:
transmitting, to the base station and after a duration associated with the configuration information, a file including second measurements based at least in part on one or more second measurement types.

25. The method of claim 22, further comprising:
transmitting, to the base station and after a duration associated with the configuration information, second measurements based at least in part on a second measurement type.

26. The method of claim 22, wherein the one or more first measurement types include at least one of:
a measurement type associated with a serving cell,
a measurement type associated with one or more neighboring cells,
a measurement type associated with a multicast-broadcast single-frequency network,
a measurement type associated with a wireless local area network,
a measurement type associated with a Bluetooth connection,
a measurement type associated with a location of the UE,
a measurement type associated with an in-device coexistence,
or a combination thereof.

27. The method of claim 22, wherein the one or more first measurement types are associated with a minimization of drive test.

28. A method of wireless communication performed by a base station, comprising:
transmitting, to a user equipment (UE), configuration information that indicates one or more first measurement types;
receiving, from the UE, periodically and while the UE is in an idle mode or an inactive state, first measurements based at least in part on the one or more first measurement types indicated in the configuration information;
receiving, from the UE, information indicating that the UE is not ready to stream the first measurements to the base station; and
receiving, from the UE and after a duration associated with the configuration information, a file including the first measurements based at least in part on the one or more first measurement types, based at least in part on the receiving the information indicating that the UE is not ready to stream the first measurements.

* * * * *